US009949237B2

(12) United States Patent
Koskela et al.

(10) Patent No.: US 9,949,237 B2
(45) Date of Patent: *Apr. 17, 2018

(54) METHOD AND APPARATUS FOR FACILITATING MACHINE GATEWAY OPERATION

(75) Inventors: Timo Koskela, Oulu (FI); Tao Chen, Espoo (FI); Gilles Charbit, Hampshire (GB); Sami-Jukka Hakola, Kempele (FI)

(73) Assignee: Nokia Technologies Oy, Espoo (FI)

(*) Notice: Subject to any disclaimer, the term of this patent is extended or adjusted under 35 U.S.C. 154(b) by 1113 days.

This patent is subject to a terminal disclaimer.

(21) Appl. No.: 13/880,045

(22) PCT Filed: Oct. 20, 2010

(86) PCT No.: PCT/FI2010/050816
§ 371 (c)(1),
(2), (4) Date: Apr. 17, 2013

(87) PCT Pub. No.: WO2012/052598
PCT Pub. Date: Apr. 26, 2012

(65) Prior Publication Data
US 2013/0212219 A1 Aug. 15, 2013

(51) Int. Cl.
*H04W 72/04* (2009.01)
*H04W 76/04* (2009.01)
(Continued)

(52) U.S. Cl.
CPC ......... *H04W 72/04* (2013.01); *H04W 76/048* (2013.01); *H04W 4/005* (2013.01); *H04W 8/005* (2013.01); *H04W 88/04* (2013.01)

(58) Field of Classification Search
CPC ... H04W 76/048; H04W 4/005; H04W 72/04; H04W 88/04; H04W 8/005; H04W 16/14;
(Continued)

(56) References Cited

U.S. PATENT DOCUMENTS 7,003,290 B1 * 2/2006 Salonaho .............. H04W 36/30
370/331
7,400,901 B2 * 7/2008 Kostic ..................... H04L 47/10
370/236
(Continued)

FOREIGN PATENT DOCUMENTS

CN 1846371 A 10/2006
CN 101009687 A 8/2007
(Continued)

OTHER PUBLICATIONS

Lehtomaki et al., "Direct Communication Between Terminals in Infrastructure Based Networks", ICT-Mobile Summitt 2008: Conference Proceedings, IMC International Information Management, 2008, 8 pages total.*
(Continued)

*Primary Examiner* — Vivek Srivastava
*Assistant Examiner* — Todd L Barker
(74) *Attorney, Agent, or Firm* — Alston & Bird LLP

(57) ABSTRACT

An apparatus (20) for providing facilitation of mobile gateway operation may include at least one processor and at least one memory including computer program code. The at least one memory and the computer program code may be configured, with the processor, to cause the apparatus to perform at least causing provision of configuration instructions (210) to one or more machines (42) where the configuration instructions define at least a discontinuous reception period and beaconing instructions for the one or more machines relative to machine communications utilizing network defined resources, and causing provision of connection information (220) to a mobile terminal (10) to identify connection parameters that correspond to the configuration instructions provided to the one or more machines where the connection information enables establishment of communi-
(Continued)

cation between the mobile terminal and the one or more machines. A corresponding method is also provided.

22 Claims, 9 Drawing Sheets

(51) Int. Cl.
*H04W 4/00* (2018.01)
*H04W 8/00* (2009.01)
*H04W 88/04* (2009.01)

(58) Field of Classification Search
CPC ... H04W 36/16; H04W 40/244; H04W 48/20; H04W 48/005; H04W 52/0229; H04W 72/02; H04W 88/10; H04W 72/042; H04W 76/023; H04W 92/18; H04W 24/02; H04W 24/10; H04W 36/08; H04W 36/32; H04W 52/0212; H04W 472/04; H04W 476/048; H04L 27/261; Y02B 60/50

See application file for complete search history.

(56) References Cited

U.S. PATENT DOCUMENTS

| | | | | |
|---|---|---|---|---|
| 8,553,644 | B2* | 10/2013 | Laroia | H04W 40/244 370/319 |
| 8,731,558 | B2* | 5/2014 | Nakamori | H04L 1/0027 455/436 |
| 9,560,140 | B2* | 1/2017 | Giaretta | H04W 4/00 |
| 9,661,509 | B2 | 5/2017 | Anepu et al. | |
| 9,661,683 | B2 | 5/2017 | Horneman et al. | |
| 2006/0268800 | A1* | 11/2006 | Sugaya | H04L 63/08 370/338 |
| 2007/0291728 | A1* | 12/2007 | Dalsgaard | H04L 12/12 370/347 |
| 2008/0130580 | A1* | 6/2008 | Chaponniere | H04W 36/02 370/331 |
| 2008/0267105 | A1 | 10/2008 | Wang et al. | |
| 2009/0247170 | A1* | 10/2009 | Balasubramanian | H04W 48/16 455/445 |
| 2009/0316675 | A1* | 12/2009 | Malladi | H04L 5/0048 370/343 |
| 2010/0054168 | A1 | 3/2010 | Igarashi et al. | |
| 2010/0261469 | A1* | 10/2010 | Ribeiro | H04W 99/00 455/423 |
| 2010/0291872 | A1* | 11/2010 | Laroia | H04W 72/12 455/41.2 |
| 2011/0176467 | A1 | 7/2011 | Lampe et al. | |
| 2011/0223953 | A1* | 9/2011 | Lee | H04W 76/023 455/509 |
| 2011/0317569 | A1* | 12/2011 | Kneckt | H04W 74/0833 370/252 |
| 2012/0207040 | A1* | 8/2012 | Comsa | H04W 72/1215 370/252 |
| 2013/0029716 | A1* | 1/2013 | Lee | H04W 4/005 455/519 |

FOREIGN PATENT DOCUMENTS

| | | |
|---|---|---|
| CN | 101420280 A | 4/2009 |
| CN | 101505523 A | 8/2009 |
| CN | 101772928 A | 7/2010 |
| WO | 2009146740 | 12/2009 |
| WO | 2010/025774 A1 | 3/2010 |
| WO | 2010049801 | 5/2010 |
| WO | 2010082114 | 7/2010 |
| WO | 2010/093718 A1 | 8/2010 |

OTHER PUBLICATIONS

International Search Report received for corresponding Patent Cooperation Treaty Application No. PCT/FI2010/050816, dated Jul. 12, 2011, 5 pages.
Written Opinion received for corresponding Patent Cooperation Treaty Application No. PCT/FI2010/050816, dated Jul. 12, 2011, 6 pages.
Office action received for corresponding Chinese Patent Application No. 201080069713.3, dated Sep. 25, 2015, 8 pages of office action and No English Language Translation available.
"3rd Generation Partnership Project; Technical Specification Group Radio Access Network; Evolved Universal Terrestrial Radio Access (E-UTRA); Medium Access Control (MAC) protocol specification (Release 9)", 3GPP TS 36.321, V9.3.0, Jun. 2010, pp. 1-48.
"3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331, V9.3.0, Jun. 2010, pp. 1-250.
Office action received for corresponding Chinese Patent Application No. 201080069713.3, dated Feb. 10, 2015, 7 pages of office action and No English Language Translation available.
*Vision 2020—50 Billion Connected Devices—Ericsson* [online][retrieved Jul. 19, 2016]. Retrieved from the Internet: <URL: http://www.slideshare.net/ericssonfrance/vision-2020-50-billion-connected-devices-ericsson>. (Dec. 22, 2009) 9 pages.
Office Action for Chinese Application No. 201080069713.3 dated Apr. 11, 2016 (previously submitted).
Supplementary European Search Report for Application No. EP 10 85 8573 dated Jun. 8, 2017, 12 pages.
Extended European Search Report for Application No. EP 10 85 8573 dated Jul. 17, 2017, 12 pages.

* cited by examiner

METHOD AND APPARATUS FOR FACILITATING MACHINE GATEWAY OPERATION

RELATED APPLICATION

This application was originally filed as PCT Application No. PCT/FI2010/050816 filed Oct. 20, 2010.

TECHNOLOGICAL FIELD

Embodiments of the present invention relate generally to inter-device communications technology and, more particularly, relate to an apparatus and method for providing machine-to-machine communication in a wireless network.

BACKGROUND

The modern communications era has brought about a tremendous expansion of wired and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Machine-to-machine (M2M) communication has recently become an area of interest for its growth potential. M2M communication is also exciting to many users and developers for its potential for connecting devices for many different purposes such as smart homes, smart metering, fleet management, remote healthcare, access network operation management and numerous other uses.

M2M communication typically involves the connection of a device or group of devices to a remote server or computer system to enable remote measurement or remote reporting of information. In some cases, M2M communication involves the use of one or more sensors or other nodes or devices to gather information that can be passed to a network or computing device via some form of gateway device. Recently, mobile terminals such as cellular phones have been employed as the gateway device in order to enable remote devices or sensors to provide information to a central location or a network for processing. In some cases, the network may be the Internet or some more localized computing or communication network.

The use of cellular communication systems in M2M applications has been advantageous due to the wide coverage areas that are currently provided by cellular communication systems. Typical endpoint devices in an M2M communication system are relatively small battery operated devices with relatively low transmission power capabilities. Thus, by interfacing with nearby mobile terminals that can connect to a cellular communication system, the endpoint devices can operate at low powers and still provide information to remote computing or storage devices via a mobile terminal acting as a gateway to, for example, a cellular network access point. While the connection between the gateway and the access point in such situations is provided by cellular network resources, the connection between the gateway and the endpoint device may be some other short range communication radio (e.g., short range radios employing Bluetooth, wireless local area network (WLAN) and/or the like). However, management of power and/or other communication resources while employing a gateway in an integrated M2M to cellular network may be challenging.

BRIEF SUMMARY OF SOME EXAMPLE EMBODIMENTS

A method and apparatus are therefore provided that may enable the facilitation of using a mobile terminal as a mobile gateway to integrate with a M2M network. Some example embodiments of the present invention may enable management of discontinuous reception (DRX) periods and/or other connection information to facilitate the connection of a mobile terminal to one or more machines in a M2M network so that the mobile terminal can function as a gateway for the M2M network to access or otherwise be integrated into a larger communication network such as, for example, a cellular network.

In one example embodiment, a method of providing facilitation of mobile gateway operation is provided. The method may include causing provision of configuration instructions to one or more machines where the configuration instructions define at least a discontinuous reception period and beaconing instructions for the one or more machines relative to machine communications utilizing network defined resources, and causing provision of connection information to a mobile terminal to identify connection parameters that correspond to the configuration instructions provided to the one or more machines where the connection information enables establishment of communication between the mobile terminal and the one or more machines.

In another example embodiment, an apparatus for providing facilitation of mobile gateway operation is provided. The apparatus may include at least one processor and at least one memory including computer program code. The at least one memory and the computer program code may be configured, with the processor, to cause the apparatus to perform at least causing provision of configuration instructions to one or more machines where the configuration instructions define at least a discontinuous reception period and beaconing instructions for the one or more machines relative to machine communications utilizing network defined resources, and causing provision of connection information to a mobile terminal to identify connection parameters that correspond to the configuration instructions provided to the one or more machines where the connection information enables establishment of communication between the mobile terminal and the one or more machines.

In another example embodiment, an apparatus for providing facilitation of mobile gateway operation is provided. The apparatus may include means for causing provision of configuration instructions to one or more machines where the configuration instructions define at least a discontinuous reception period and beaconing instructions for the one or more machines relative to machine communications utilizing network defined resources, and means for causing provision of connection information to a mobile terminal to identify connection parameters that correspond to the configuration instructions provided to the one or more machines where the connection information enables establishment of communication between the mobile terminal and the one or more machines.

In another example embodiment, a method of providing facilitation of mobile gateway operation is provided. The method, from the perspective of a mobile terminal, may include receiving connection information from a network device where the connection information identifies connection parameters that correspond to configuration instructions provided by the network device to one or more machines, and utilizing the connection information to establish communication between the mobile terminal and the one or more machines using the connection parameters defining at least a discontinuous reception period and beaconing instructions for utilizing network defined resources.

In another example embodiment, an apparatus for providing facilitation of mobile gateway operation is provided. The apparatus may include at least one processor and at least one memory including computer program code. The at least one memory and the computer program code may be configured, with the processor, to cause the apparatus to perform at least receiving connection information from a network device where the connection information identifies connection parameters that correspond to configuration instructions provided by the network device to one or more machines, and utilizing the connection information to establish communication between the mobile terminal and the one or more machines using the connection parameters defining at least a discontinuous reception period and beaconing instructions for utilizing network defined resources.

In another example embodiment, an apparatus for providing facilitation of mobile gateway operation is provided. The apparatus may include means for receiving connection information from a network device where the connection information identifies connection parameters that correspond to configuration instructions provided by the network device to one or more machines, and means for utilizing the connection information to establish communication between the mobile terminal and the one or more machines using the connection parameters defining at least a discontinuous reception period and beaconing instructions for utilizing network defined resources.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
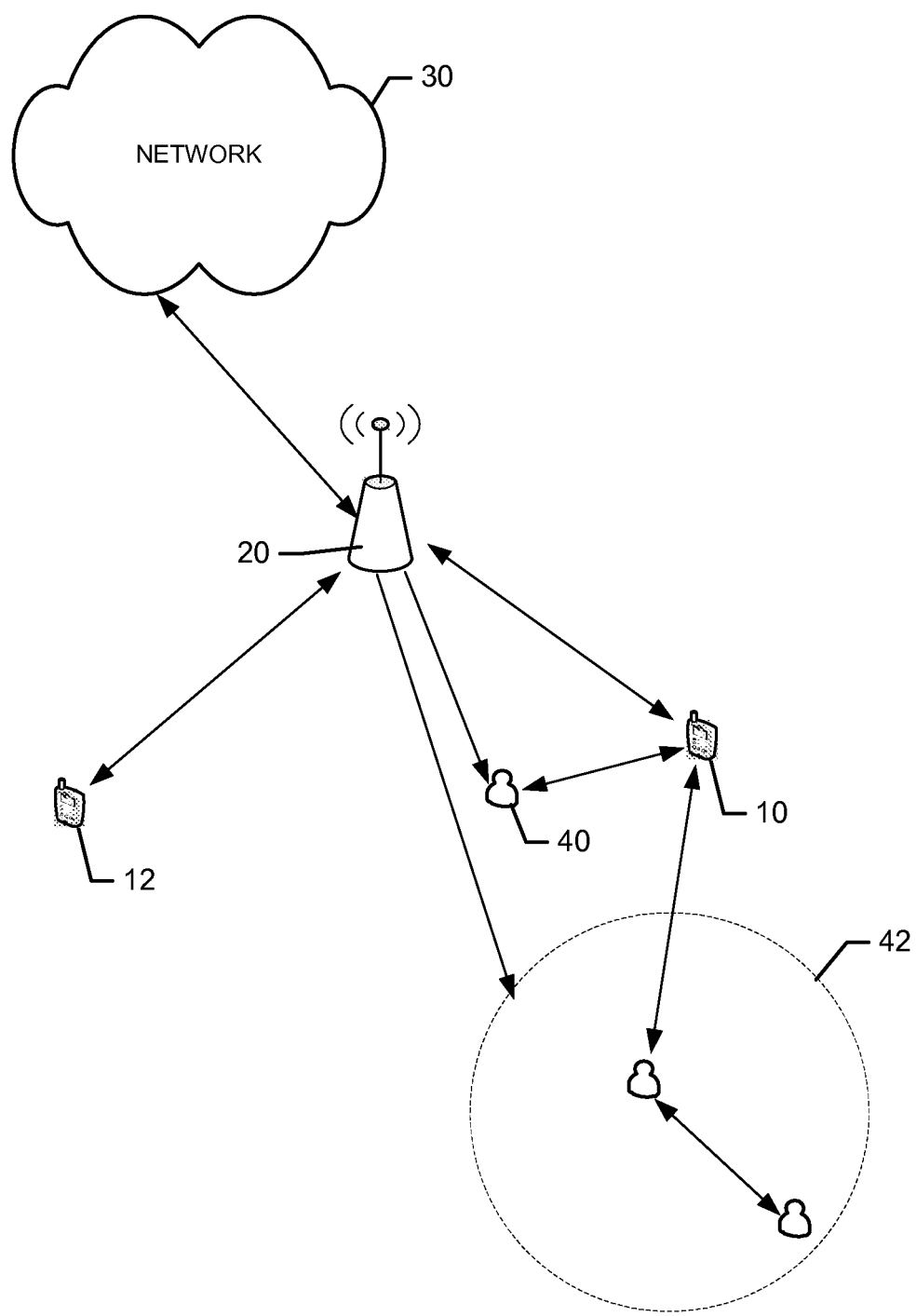
FIG. 1 illustrates one example of a communication system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, mobile terminals may act as gateway devices to integrate in a M2M communication system into a larger network. The M2M communication system may include one or more sensors or other low power communication devices (e.g., machines) that cannot, in some examples due to transmission power limitations, but in some other examples perhaps also due to using different radios, communicate directly with a base station or access point of the larger network. Thus, the mobile terminal may relay communications from the machines to the base station or access point thereby acting as a gateway for the M2M communication system into the larger network. In some cases, the mobile terminal (or mobile gateway when acting as the gateway) may employ two different radios to perform the relaying function, particularly when employed with M2M communication systems involving relatively low power (e.g., low transmission power) sensors or sensor networks.

In some cases, the machines (or groups of machines) may be assigned relatively long DRX periods in order to save power. The machines may also have other access parameters associated therewith that may make connection with a mobile terminal that is approaching the machines more challenging if the mobile terminal does not know the access parameters and/or has no way to discover those access parameters. Thus, for example, if a mobile terminal is approaching one or more machines, and those machines have specific access parameters associated therewith, the mobile terminal may not be able to establish communication with the machines unless the mobile terminal can acquire the access parameters. Moreover, the mobile terminal may not even be aware of the presence of the machines and therefore may not even be aware that access parameters could be requested for enabling interface with the machines.

One way to enable the mobile terminal to interface with the machines to learn the access parameters may be to have the machines provide beacon signals either continuously or periodically in order to inform the mobile terminal of their presence. The beacon signals may at least inform the mobile terminal of the presence of the machines and thereby facilitate the mobile terminal's accessing of the access parameters. However, continuous and even periodic beaconing of the machines may be a waste of battery power, particularly when no mobile terminal is in the vicinity.

Some embodiments of the present invention may provide a mechanism by which sensors or sensor networks may be allocated specific wireless network resources by the access point. In some cases, in a wireless network employing cellular network resources, the cellular network access point may allocate specific cellular network resources for communication conducted between the endpoint machine or machines (e.g., the sensors) and the access point and gateway device. For example, the access point may allocate cellular downlink channel resources for downlink direction communications from the access point to the machine(s) and between the gateway device (or relay) and the machine(s). Communications to be provided from the machine(s) to the access point may then be routed through the gateway device and the gateway device can relay those communications via cellular network uplink resources.

Some example embodiments of the present invention may further provide for facilitation of using the mobile terminal as a gateway by utilizing the network to manage connection setup between the mobile terminal and one or more machines of a M2M communication system. Moreover, in some examples, the connection setup between the mobile terminal and the one or more machines of the M2M communication system may be provided in a manner that is power efficient. In this regard, the network may be configured to provide configuration instructions to the machine(s) either in response to a mobile terminal request for such information or in response to determining that the mobile terminal is approaching the machine(s). The network may also provide connection information to the mobile terminal to identify connection parameters that correspond to the configuration instructions provided to the machine(s). Thereafter, the machine(s) and the mobile terminal may perform a handshake procedure and utilize predefined resources allocated by the network for communication. As such, continuous and/or periodic beaconing of the machine(s) may be avoided to conserve battery power and integration of the M2M communication system (or other device to device (D2D) communication systems) may be accomplished in a relatively efficient manner.

Many devices (e.g., user equipments (UEs) or other mobile terminals, base stations or other access points such as node Bs (NBs) or evolved node Bs (eNBs), etc.) may include multiple radios or may otherwise have configurable antennas to permit operation over multiple frequencies. Some example embodiments may be useful in connection with D2D and/or M2M communication, although embodiments may be useful in other environments as well. FIG. 1 illustrates a generic system diagram in which a device such as a mobile terminal 10 (or UE), is shown in an example communication environment in which embodiments of the present invention may be employed. As shown in FIG. 1, an embodiment of a system in accordance with an example embodiment of the present invention may include a first communication device (e.g., mobile terminal 10) and a second communication device 12 that may each be capable of communication with a network 30. The second communication device 12 is provided as an example to illustrate potential multiplicity with respect to instances of other devices that may be included in the network 30 and that may practice some of example embodiments. The communications devices of the system may be able to communicate with network devices or with each other via the network 30. In some cases, the communication devices may be provided with access to the network via a base station, access point or other communication node (e.g., eNB 20). The eNB 20 may have a coverage area that defines a region within which communication devices may utilize the eNB 20 to access the network 30.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the mobile terminal 10 and/or the second communication device 12 may be in communication with each other via the network 30 or via D2D communication. In some cases, each of the communication terminals may include an antenna or antennas for transmitting signals to and for receiving signals from a base site (e.g., eNB 20). The base site could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing circuitry (e.g., personal computers, server computers or the like) may be coupled to the mobile terminal 10 and/or the second communication device 12 via the network 30. In some embodiments, the network 30 may employ one or more mobile access mechanisms such as wideband code division multiple access (WCDMA), CDMA2000, global system for mobile communications (GSM), general packet radio service (GPRS), long term evolution (LTE), LTE advanced (LTE-A) and/or the like may be supported.

In some example embodiments, the mobile terminal 10 (and/or the second communication device 12) may be a mobile communication device such as, for example, a personal digital assistant (PDA), wireless telephone, mobile computing device, camera, video recorder, audio/video player, positioning device (e.g., a global positioning system (GPS) device), game device, television device, radio device, or various other like devices or combinations thereof. As such, the mobile terminal 10 may include one or more processors and one or more memories for storing instructions, which when executed by the processor, cause the mobile terminal 10 to operate in a particular way or execute specific functionality. The mobile terminal 10 may also include communication circuitry and corresponding hardware/software to enable communication with other devices.

In some embodiments, one or more of the communication devices (e.g., the mobile terminal 10 or the second communication device 12) may act as a relay or gateway device for other communication devices or machines such as sensors to communicate with the network 30 and/or other devices. FIG. 1 illustrates an example of a sensor (e.g., machine 40) that may communicate with the eNB 20 via the mobile terminal 10 acting as a gateway device. In some cases, the mobile terminal 10 may act as a gateway for a group of sensors or machines (e.g., machine group 42). In some cases, the sensors of the machine group 42 may be able to communicate with each other and one or more of the sensors may then communicate with the mobile terminal 10 acting as a gateway for access to the network 30. The machine 40 and/or the machine group 42 may be enabled to receive communications over an air interface from either or both of the mobile terminal 10 and the eNB 20. However, in many cases, it can be expected that power limitations or other restrictions may prevent the machine 40 and/or the machine group 42 from directly communicating with the eNB 20, which is why they may employ the mobile terminal 10 as a gateway for access to the network 30 via the eNB 20. Although example embodiments will be described hereinafter that may include either one or multiple machines, it should be appreciated that the use of one or multiple machines in connection with the gateway device is interchangeable.

Figure 2:
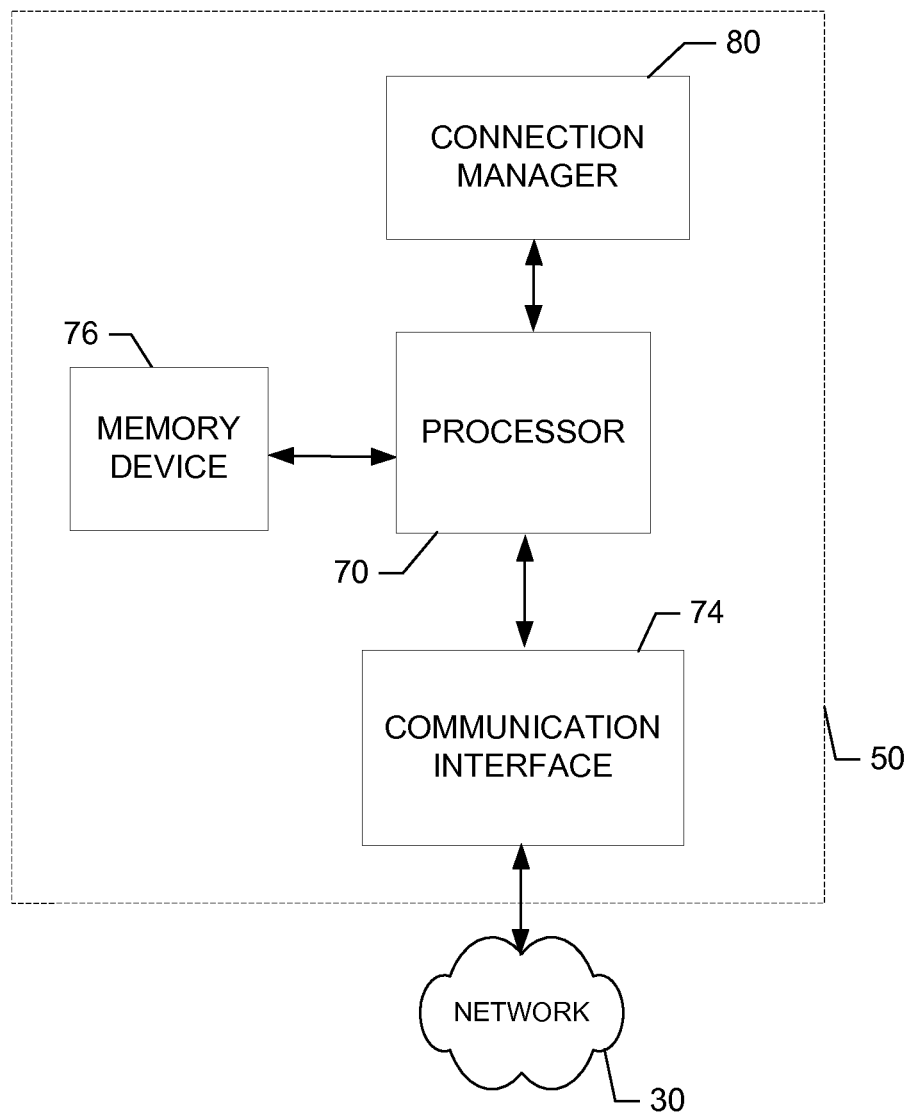
FIG. 2 illustrates a block diagram of an apparatus that may be employed at a network element for managing connections with M2M devices or systems in accordance with an example embodiment of the present invention.
Figure 3:
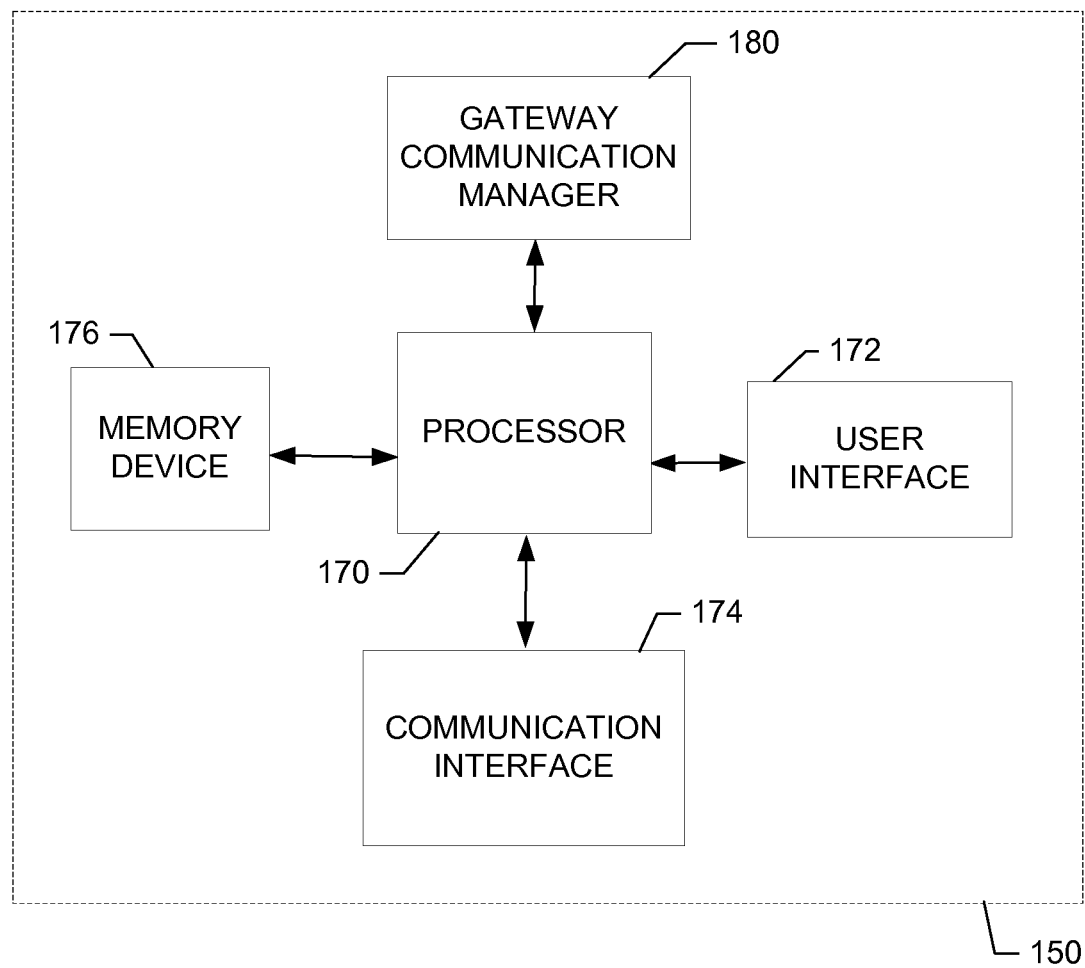
FIG. 3 illustrates a block diagram of an apparatus that may be employed at a mobile terminal for establishing connections with M2M devices or systems in accordance with an example embodiment of the present invention.

In an example embodiment, each of the sensors or machines, the mobile terminal 10 and the network 30 or eNB 20 may include processing devices (e.g., a processor) and memory devices for storing instructions that when executed by the processor cause a corresponding functionality to be performed. These processing devices may embody or otherwise control, in some cases, modules and/or components configured for performing certain functions associated with example embodiments of the present invention. FIGS. 2 and 3 illustrate some examples of components that may be employed in connection with some example embodiments.

FIG. 2 illustrates a block diagram of an apparatus 50 that may be employed at a network element (e.g., the eNB 20) for managing connections with M2M devices or systems. The apparatus 50 may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in hardware in a number of different ways. For example, the processor 70 may be embodied as one or more of various processing means such as a coprocessor, a microprocessor, a controller, a digital signal processor (DSP), a processing element with or without an accompanying DSP, or various other examples of processing circuitry including integrated circuits such as, for example, an ASIC (application specific integrated circuit), an FPGA (field programmable gate array), a microcontroller unit (MCU), a hardware accelerator, a special-purpose computer chip, or other similar hardware embodiments. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., an eNB, AP or other network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network 30. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control a connection manager 80. As such, in some embodiments, the processor 70 may be said to cause, direct or control the execution or occurrence of the various functions attributed to the connection manager 80 as described herein. The connection manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the connection manager 80 as described herein. Thus, in examples in which software is employed, a device or circuitry (e.g., the processor 70 in one example) executing the software forms the structure associated with such means.

The connection manager 80 may be configured to provide configuration instructions to one or more machines either in response to a request from the mobile terminal 10 or in response to determining (by the connection manager 80 or some other component o the eNB 20) that the mobile terminal is approaching the one or more machines. The network may also provide connection information to the mobile terminal 10 to identify connection parameters that correspond to the configuration instructions provided to the one or more machines to facilitate the performance of a handshake procedure between the mobile terminal 10 and the one or more machines for utilization of predefined resources allocated by the network for communication.

In some embodiments, the configuration instructions could be provided to the machines as system information that is transmitted and can be read by machines that enter into a coverage area of the eNB 20. By reading the system information after downlink synchronization with the eNB 20, the machines may learn configuration information such as the DRX configuration for machine type communications. The machines may then be enabled to transmit beacon signals (e.g., during "on-duration" periods) to enable discovery of other nearby machines for inter-machine (e.g., M2M) communication. In some cases, the configuration information may define randomly or otherwise selected time/frequency/code division multiplexed patterns in predefined resources allocated by the network. The machines may exchange machine identifiers (IDs) to form a machine group. In some examples, each machine may store a list of machine beacon signal received power (MBSRP) values and the machines may indicate whether they have a connection request to the eNB 20 via a gateway device (e.g., the mobile terminal 10) to transfer machine data or receive machine specific control signaling from the network. In some cases, the machines may save power and reduce inter-machine interference by transmitting beacon signals during the "on-duration" in specific cases. For example, the specific cases may include periods during initial machine setup (e.g., after powering on), following detection of a new machine beacon or mobile gateway beacon for allowing inter-machine communication or allowing machine to gateway communication, or in situations when there is a need to connect to a mobile gateway to forward machine data to or acquire machine configuration parameters from the network.

Accordingly, as indicated above, the connection manager 80 may be configured to provide configuration instructions that may be used to establish machine initiated beaconing (that may result in establishing M2M or machine to gateway communication) or to establish gateway initiated beaconing (e.g., where the mobile gateway can receive connection information enabling it to transmit beacon signals to provide machine discovery).

In gateway initiated beaconing, as indicated above, the mobile terminal 10 may request the configuration instructions from the eNB 20. The connection manager 80, responsive to the request, may provide connection information to the mobile terminal 10 including information such as the DRX pattern for the machines (or machine group), beaconing information, security configuration information and/or the like, for machines within the cell covered by the eNB 20. In some cases, the request may be provided via radio resource control (RRC) signaling. Similar to the procedure for machines above, the mobile terminal 10 (acting as a gateway) may transmit beacon signals for nearby machine discovery and inter-machine communication using the beaconing information received from the network.

In some embodiments, the mobile terminal 10 may include an apparatus 150 for facilitating managing connections with M2M devices or systems and the eNB 20 as shown in FIG. 3. The apparatus 150 may be employed in connection with a communication device (e.g., mobile terminal 10 and/or the second communication device 12) practicing an example embodiment of the present invention. The apparatus 150 may include or otherwise be in communication with a processor 170, a user interface 172, a communication interface 174 and a memory device 176. The processor 170, the communication interface 174, and the memory device 176 may each be similar in general function and form to the processor 70, the communication interface 74 and the memory device 76 described above (except perhaps with semantic and scale differences), so a detailed explanation of these components will not be provided. The user interface 172 may be in communication with the processor 170 to receive an indication of a user input at the user interface 172 and/or to provide an audible, visual, mechanical or other output to the user. As such, the user interface 172 may include, for example, a keyboard, a mouse, a joystick, a display, a touch screen, soft keys, a microphone, a speaker, or other input/output mechanisms. In this regard, for example, the processor 170 may comprise user interface circuitry configured to control at least some functions of one or more elements of the user interface, such as, for example, a speaker, ringer, microphone, display, and/or the like. The processor 170 and/or user interface circuitry comprising the processor 170 may be configured to control one or more functions of one or more elements of the user interface through computer program instructions (e.g., software and/or firmware) stored on a memory accessible to the processor 170 (e.g., memory device 176, and/or the like).

In an example embodiment, the processor 170 may be embodied as, include or otherwise control a gateway communication manager 180. The gateway communication manager 180 may be any means such as a device or circuitry operating in accordance with software or otherwise embodied in hardware or a combination of hardware and software (e.g., processor 170 operating under software control, the processor 170 embodied as an ASIC or FPGA specifically configured to perform the operations described herein, or a combination thereof) thereby configuring the device or circuitry to perform the corresponding functions of the gateway communication manager 180 as described herein. Thus, in examples in which software is employed, a device or circuitry (e.g., the processor 170 in one example) executing the software forms the structure associated with such means.

In an example embodiment, the gateway communication manager 180 may be configured to request connection information from the eNB 20 for enabling communication with machines in the coverage area of the eNB 20. In some cases, the gateway communication manager 180 may be configured to make the request upon initial entry into a new cell, or responsive to other triggering events or criteria. Responsive to the request, the eNB 20 (e.g., via the connection manager 80) may provide the connection information to the mobile terminal 10. The connection information may include the DRX pattern, the beaconing information, the security configuration, and/or the like as indicated above. The gateway communication manager 180 may then be enabled to initiate beaconing as described above in order to establish a connection to a machine or machine group in order to function as a gateway for enabling the machine group to send machine or sensor data to the network.

As also indicated above, in some embodiments, rather than requesting the connection information, the network (e.g., via the eNB 20) may proactively provide the connection information to the mobile terminal 10 when the network determines that the mobile terminal 10 is approaching a particular machine or machine group. In such an example, the gateway communication manager 180 may be configured to receive the connection information and use the connection information as described above for establishing communication with the machine or machine group.

In some embodiments, the gateway communication manager 180 may also or alternatively be configured to support automatic paging procedure initiation. In this regard, in some cases, the connection manager 80 may be configured to, based on a detection of a mobile terminal that can function as a gateway, configure the mobile terminal (e.g., via the gateway communication manager 180) by providing paging triggering parameters to the mobile terminal (e.g., mobile terminal 10). The parameters may be provided via RRC signaling to enable cell-ID location based and autonomous paging of machines by the mobile terminal 10 as a candidate gateway device. In other words, when the mobile terminal 10 arrives in a certain geographical cell area, the mobile terminal 10 may start paging local machines using cell-specific machine paging signals with allowed machine transmission power being referred to as the mobile gateway initiated beaconing described above. In some cases, responsive to receipt of mobile terminal beaconing, the machines may also begin transmission of their own machine initiated beaconing.

Figure 4:
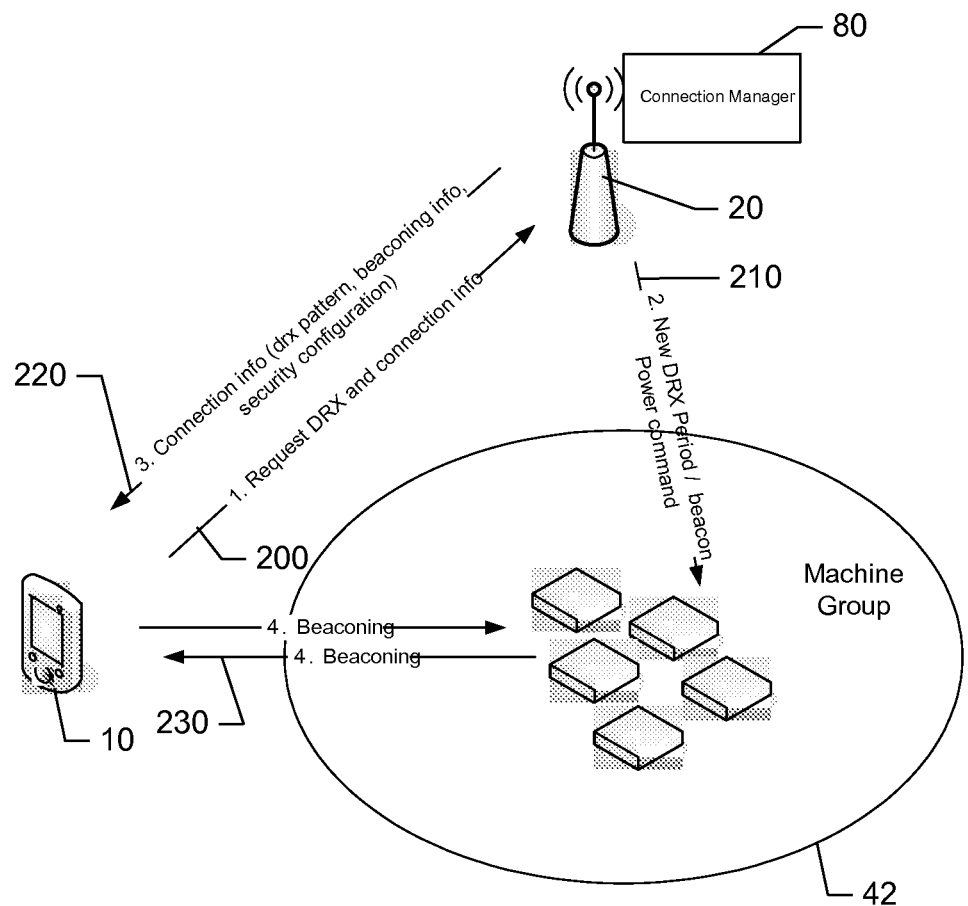
FIG. 4 illustrates gateway initiated procedures associated with establishing integration of a M2M system with a network via a gateway device according to an example embodiment of the present invention.
Figure 5:
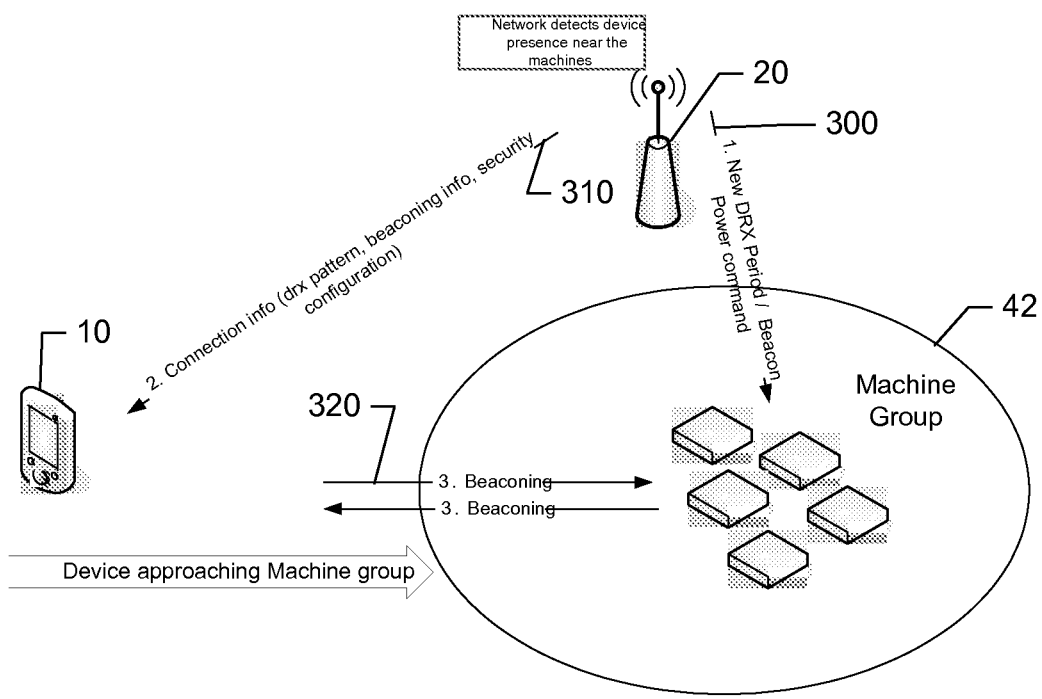
FIG. 5 illustrates a network initiated access procedure associated with establishing integration of a M2M system with a network via a gateway device in accordance with an example embodiment of the present invention.

FIGS. 4 and 5 illustrate example procedures associated with establishing integration of a M2M system with a network via a gateway device. In this regard, FIG. 4 illustrates a gateway initiated access procedure and FIG. 5 illustrates a network initiated access procedure. As shown in FIG. 4, the mobile terminal 10 may initially send a request to the eNB 20 at operation 200. The request may be a request for connection information for machines (or machine group 42) within the cell of the eNB 20. The connection information may include the DRX pattern and default or otherwise specified access parameters of the machine group 42. Upon receipt of the request, the eNB 20 (e.g., via the connection manager 80) may provide new and/or updated configuration instructions to the machine group at operation 210. The configuration instructions may include the access parameters such as the DRX pattern (or period) and beacon power commands. In some cases, the DRX pattern may be a default DRX pattern, while in other cases, the DRX pattern may be an arbitrary DRX pattern for the machine group 42. The mobile terminal 10 may be informed as to the same DRX pattern provided to the machine group 42. In some embodiments, if no common beaconing resources are available, the eNB 20 (e.g., via the connection manager 80) may assign resources for beaconing. The eNB 20 may use repetitive transmissions if no feedback channel (e.g., a channel with only control plane connection to the network, but no user-plane capability for data transfer) is available for machines.

At operation 220, the eNB 20 may provide a reply to the request sent by the mobile terminal 10. The reply may include connection information corresponding to the configuration instructions. As such, the connection information may include the DRX pattern, beaconing information (e.g., initial access parameters), security information, and/or the like. The security information may include security keys for initial authentication, which may be used to authenticate machines to the network.

After the connection information is provided to the mobile terminal 10 (e.g., specifically to the gateway communication manager 180 of the mobile terminal 10), the mobile terminal 10 (or gateway) may initiate a handshake procedure with machines of the machine group 42 using predefined resources allocated by the network as indicated by the dual direction beaconing activity shown at operation 230. After the handshake procedure, the mobile terminal 10 and machines of the machine group 42 may communicate in the cell in secondary fashion or the mobile terminal 10 may request other scheduled resources from the network to support communication between the mobile terminal 10 and machines of the machine group 42.

As shown in FIG. 5, in an example where the network initiates the access procedure, the network (e.g. eNB 20) may initially detect that a machine transmission capable device (e.g., the mobile terminal 10) that can act as a mobile gateway is nearby or even approaching a known machine or machine group. In cases where the mobile terminal 10 is approaching the known machine or machine group, connection setup may be easier if the mobile terminal 10 is approaching with a relatively low-velocity. Thereafter, at operation 300, the network may initiate (e.g., via the connection manager 80) a machine wake up procedure by transmitting new configuration instructions. The new configuration instructions may include a new DRX configuration and/or new beaconing configuration information (e.g., beacon power commands) applicable to enable the machine group 42 to pair with the approaching mobile terminal 10. At operation 310, the network (e.g., again via the connection manager 80) may be configured to transmit the connection information (e.g., including the DRX configuration, beaconing information and/or security configuration information) to the mobile terminal 10. Thereafter, at operation 320, the predefined handshake described above in connection with operation 230 may be undertaken.

In the context of the example of FIG. 5, it may be assumed that the network knows the locations of the machines initially and can track an approaching mobile terminal. This example embodiment may, among other times, be useful when the network needs to obtain machine data from the machine group 42, but needs to utilize a device that can act as a gateway to extract the machine data from the machine group 42.

Figure 6:
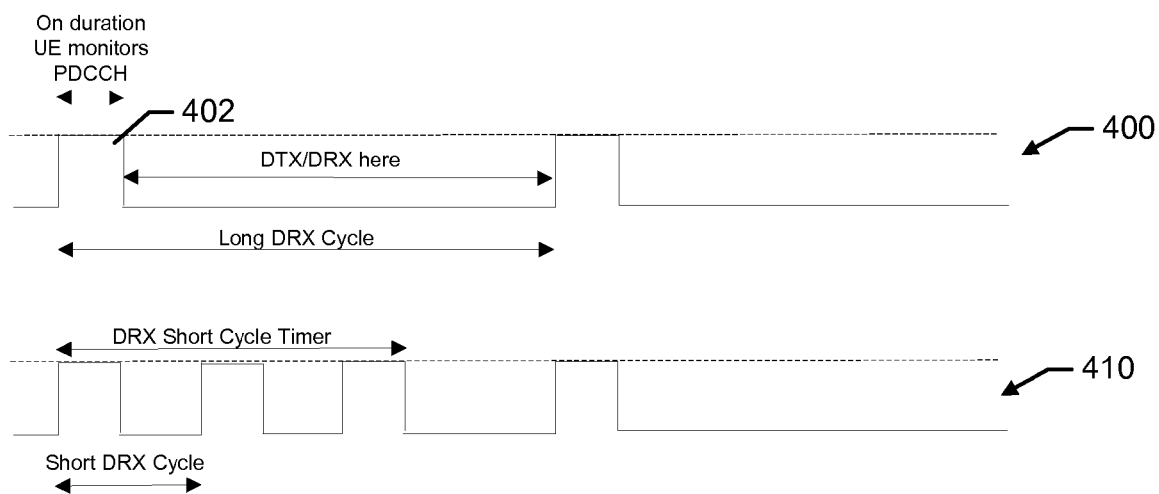
FIG. 6 illustrates example discontinuous reception cycles that may be employed according to example embodiments of the present invention.

In an example embodiment, a long DRX cycle may be configured for machine beaconing purposes. In an example case, a minimum duration of 1 ms (onDurationTimer=one subframe) with a maximum DRX inactivity of 2.56 s (drx-InactivityTimer=2560 subframes) may be employed. A long DRX cycle may be configured, or alternatively a periodical short DRX cycle may be configured as illustrated in FIG. 6. If it is assumed that the eNB 20 can track the location of an approaching or nearby mobile gateway (e.g., the mobile terminal 10), the eNB 20 may be enabled to change machine DRX configuration with some delay depending on whether the network configures the machine DRX cycle by RRC signaling via direct eNB to machine links for the downlink and via the mobile gateway on the uplink or by broadcasting a new machine system information block SIB). The use of RRC signaling may assume that the machine or machines look for a mobile gateway connection after powering on to initiate an RRC session with the eNB to receive machine DRX cycle information. The machine may initially transmit beaconing without DRX in order to connect to the mobile gateway and, after the DRX cycle is received, the machine may transmit beaconing during the on duration in the DRX cycle. The use of broadcasting may enable new machines to obtain DRX configuration parameters after powering on as broadcasted by the eNB and before they have had an opportunity to connect to a mobile gateway. Machine beaconing may be efficiently transmitted during an on duration in the DRX cycle to save machine transmission power.

FIG. 6 illustrates example DRX cycle configurations according to an example embodiment. In this regard, cycle 400 illustrates an on duration 402 during which the PDCCH is monitored by the mobile terminal (or UE) and the DRX cycle is relatively long. Meanwhile, cycle 410 illustrates an example where the DRX cycle is relatively short. In an example in which the machine DRX configuration is broadcast via SIB, a new machine SIB using any of the spare SIB types (spare1, spare2, . . . , spare5) as specified sib-MappingInfo field information in a SIB1 may be used. The new machine SIB may include the machine DRX configuration parameters as described above, as well as machine specific configuration parameters such as, for example, machine time/frequency resources, machine beacon or gateway beacon time/frequency/code division multiplexing parameters during the on duration, and/or the like. The machine and gateway may only transmit beacons during part of the on duration in some cases. The remainder of the on duration may be used to monitor system information, paging and control signaling from the network.

In some embodiments, the mobile terminal 10 (e.g., acting as a mobile gateway) may obtain machine identifiers, the list of MBSRP, and a request for connection to the eNB 20 via mobile gateway (e.g., a connection request to eNB via a machine gateway (CR-MGW)), from a subset of hearable machines in the machine group 42 (e.g., within machine transmission range). The mobile terminal 10 may then inform the eNB 20 about the machine group 42 and CR-MGW status. Based on the list of MBSRP and CR-MGW of the machines, the eNB 20 may allow higher machine transmission power for a period of time to enable the mobile terminal 10 to hear beacons from otherwise non-hearable machines in the machine group 42 (if any exist) in order to allow the mobile terminal 10 to connect to them as well. The eNB 20 may configure the higher machine transmission power for the non-hearable machines via RRC signaling communicated first to the hearable machine subset by the mobile terminal 10, and then via inter-machine communications between hearable machines and non-hearable machines. The non-hearable machines may acknowledge the new machine transmission power by RRC signaling to the eNB 20 via the hearable machines and then mobile terminal 10. Inter mobile gateway—machine control signaling and data communication may then proceed, followed by the mobile terminal 10 (acting still as the mobile gateway) forwarding machine data to the network or relaying network data to the machines.

In some example embodiments, it may be desirable (or necessary) to know the location of the machines with accuracy. The degree of accuracy that is desirable may depend on where the user puts positions system components (e.g. a smart electricity meter in a home environment) or how the network can provide location information (e.g. via network-connected laptop or access point). Companies installing machines may, for example during the installation, perform a one-off GPS measurement and log the GPS coordinates in a database. The machine location accuracy could be within a few meters depending on the size of the environment (e.g., house or building). The installers may then share and/or sell their database (e.g., to LTE, LTE-A network operators).

The machines may perform self-synchronization using primary/secondary synchronization channels (P/S-SCH) and connection requests (CRS) transmitted by a nearby eNB. Further, the machines may be enabled to make Receive Signal Time Difference measurements based on Positioning Reference Signals transmitted by a serving eNB and neighboring eNBs based on specified measurements that may be reported by the machine to a serving device via a mobile gateway and corresponding eNB when a mobile gateway connection becomes available. Since the machines are assumed to be fixed, this may be done only once or repeated in case machines are moved to another location.

Similarly, the mobile gateway may go through positioning procedure with the eNB, except that the mobile gateway may be enabled to report measurements to a serving Enhanced Serving Mobile Location Centre (E-SMLC) via the eNB directly. To track a location of the mobile gateway, the network may need to get regular positioning fix information from the mobile gateway. Alternatively, a GPS fix from the mobile gateway may be obtained by the network if the mobile gateway is equipped with a GPS modem. The machine locations and the mobile gateway may be logged in the database.

Figure 7:
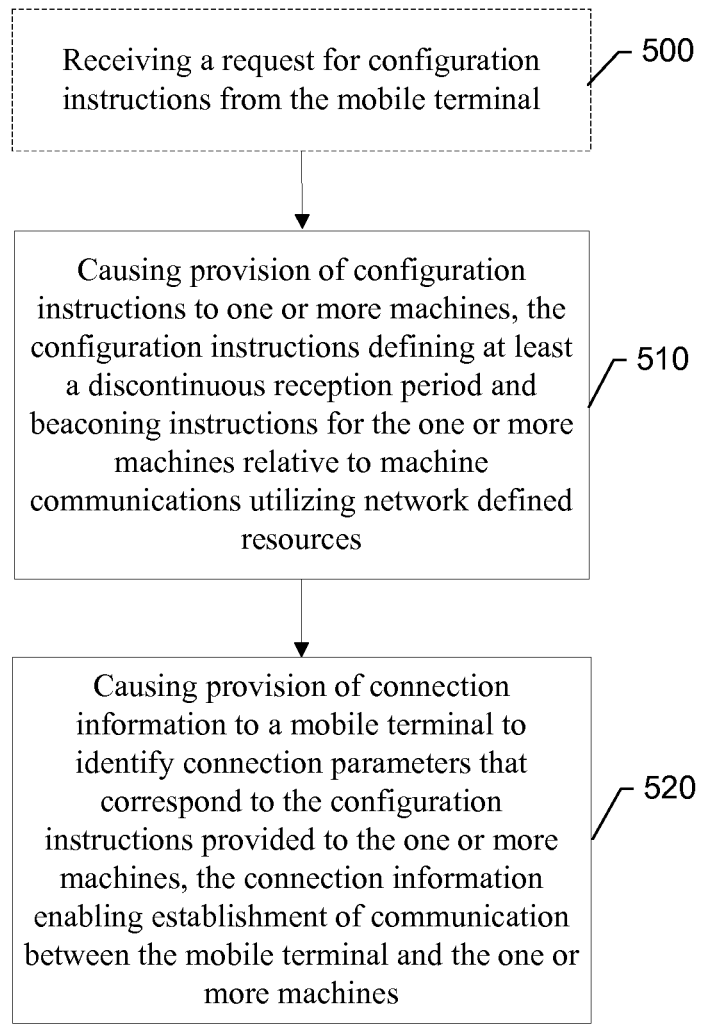
FIG. 7 illustrates a flowchart of a method of providing facilitation of mobile gateway operation in accordance with an example embodiment of the present invention.
Figure 8:
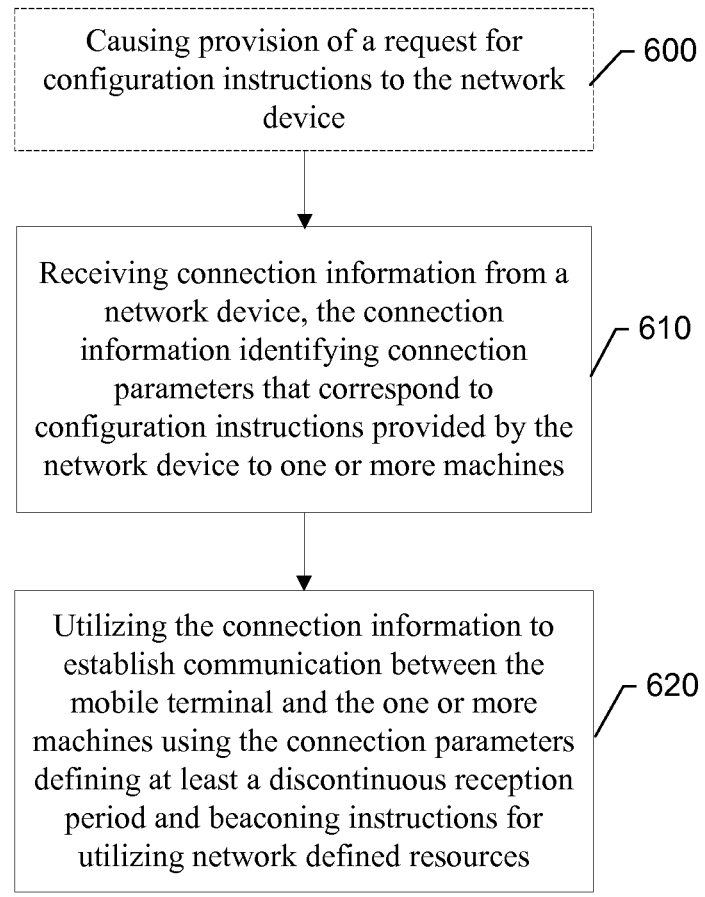
FIG. 8 illustrates a flowchart of another method of providing facilitation of mobile gateway operation in accordance with an example embodiment of the present invention.
Figure 9:
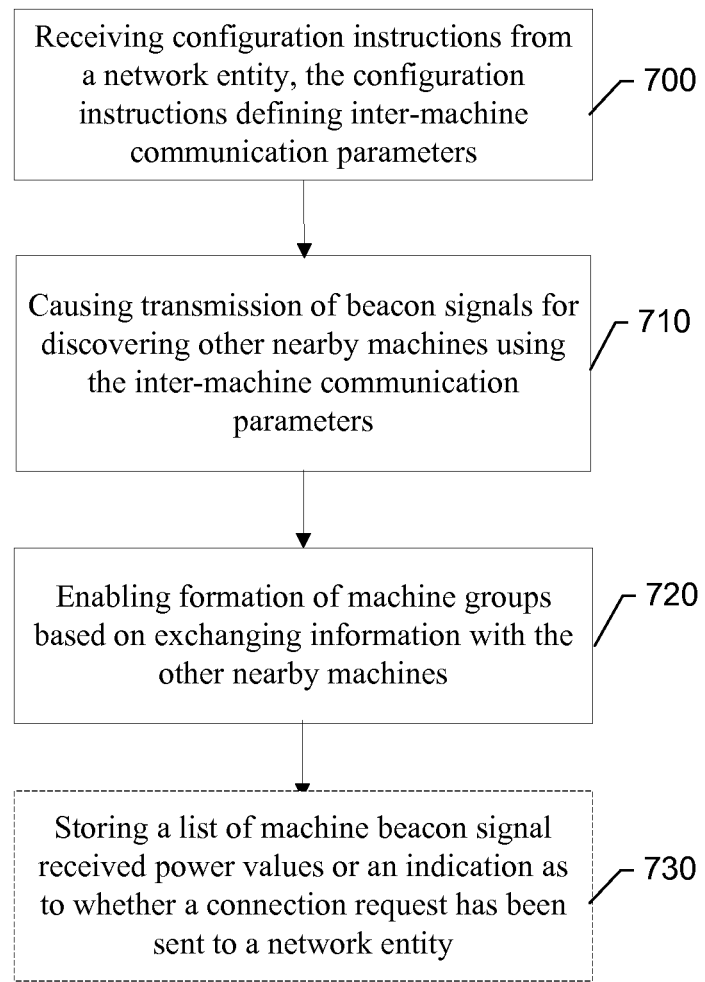
FIG. 9 illustrates a flowchart of yet another method of providing facilitation of mobile gateway operation in accordance with an example embodiment of the present invention.

FIGS. 7, 8 and 9 are flowcharts of a system, method and program product according to some example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, one embodiment of a method for providing facilitation of mobile gateway operation from the perspective of a network device (e.g., eNB 20), as shown in FIG. 7, includes causing provision of configuration instructions to one or more machines where the configuration instructions define connection parameters (e.g., at least a discontinuous reception period and beaconing instructions) for the one or more machines relative to machine communications utilizing network defined resources at operation 510, and causing provision of connection information to a mobile terminal to identify connection parameters that correspond to the configuration instructions provided to the one or more machines where the connection information enables establishment of communication between the mobile terminal and the one or more machines at operation 520.

In some embodiments, certain ones of the operations above may be modified or further amplified as described below. Moreover, in some embodiments additional optional operations may also be included, an example of which is shown in dashed lines in FIG. 7. It should be appreciated that each of the modifications, optional additions or amplifications below may be included with the operations above either alone or in combination with any others among the features described herein. In an example embodiment, the method may further include receiving a request for configuration instructions from the mobile terminal at operation 500. In such an example, causing provision of the configuration instructions may include providing the configuration instructions responsive to receipt of the request. However, in some alternative embodiments, causing provision of the configuration instructions may include causing provision of the configuration instructions responsive to a determination that the mobile terminal is approaching the one or more machines. In some embodiments, causing provision of connection information to the mobile terminal may include causing provision of information that facilitates performance of a handshake procedure between the mobile terminal and the one or more machines to enable utilization of the network defined resources allocated for the communication between the mobile terminal and the one or more machines. In example embodiment, causing provision of the configuration instructions may include causing provision of system information to the one or more machines to define inter-machine communication parameters and machine initiated beaconing instructions. In some cases, causing provision of the configuration instructions may include causing provision of discontinuous reception cycle information for beacon signaling. In an example embodiment, causing provision of connection information to the mobile terminal may include causing provision of instructions for communication to the one or more machines to temporarily increase transmission power to increase a likelihood that otherwise unhearable machines are detectable by the mobile terminal.

Another embodiment of a method for providing facilitation of mobile gateway operation from the perspective of a mobile gateway device (e.g., mobile terminal 10), as shown in FIG. 8, includes receiving connection information from a network device where the connection information identifies connection parameters that correspond to configuration instructions provided by the network device to one or more machines at operation 610, and utilizing the connection information to establish communication between the mobile terminal and the one or more machines using the connection parameters. The connection parameters may define at least a discontinuous reception period and beaconing instructions for utilizing network defined resources at operation 620.

In some embodiments, certain ones of the operations above may be modified or further amplified as described below. Moreover, in some embodiments additional optional operations may also be included, an example of which is shown in dashed lines in FIG. 8. It should be appreciated that each of the modifications or amplifications below may be included with the operations above either alone or in combination with any others among the features described herein. In an example embodiment, the method may further include causing provision of a request for configuration instructions to the network device at operation 600. In such an example, receiving the configuration instructions may include receiving the configuration instructions responsive to the request. In some examples, receiving the connection information may include receiving instructions for communication to the one or more machines to temporarily increase transmission power to increase a likelihood that otherwise unhearable machines are detectable.

Another embodiment of a method for providing facilitation of mobile gateway operation from the perspective of a machine, as shown in FIG. 9, includes receiving configuration instructions from a network entity at operation 700. The configuration instructions may define inter-machine communication parameters. The method may further include causing transmission of beacon signals for discovering other nearby machines using the inter-machine communication parameters at operation 710 and enabling formation of machine groups based on exchanging information with the other nearby machines at operation 720.

In some embodiments, certain ones of the operations above may be modified or further amplified as described below. Moreover, in some embodiments additional optional operations may also be included, an example of which is shown in dashed lines in FIG. 9. It should be appreciated that each of the modifications or amplifications below may be included with the operations above either alone or in combination with any others among the features described herein. In an example embodiment, the method may further include storing a list of machine beacon signal received power values or an indication as to whether a connection request has been sent to a network entity at operation 730. In some examples, the inter-machine communication parameters may include information defining a discontinuous reception cycle for inter-machine communication. An apparatus for performing the method of FIG. 9 may include one or more processors configured to perform the operations 700-730 by performing hardware implemented logical functions, executing stored instructions, or executing algorithms for performing each of the operations in connection with program code instructions stored in one or more memories. Alternatively, the apparatus may comprise means for performing each of the operations described above in which the means include, for example, the one or more processors.

In an example embodiment, an apparatus for performing the method of FIG. 7 above may comprise a processor (e.g., processor 70) configured to perform some or each of the operations (500-520) described above. The processor may, for example, be configured to perform the operations (500-520) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 500-520 may comprise, for example, the connection manager 80. Additionally or alternatively, at least by virtue of the fact that the processor 70 may be configured to control or even be embodied as the connection manager 80, the processor 70 and/or a device or circuitry for executing instructions or executing an algorithm for processing information as described above may also form example means for performing operations 500-520.

In an example embodiment, an apparatus for performing the method of FIG. 8 above may comprise a processor (e.g., the processor 170) configured to perform some or each of the operations (600-620) described above. The processor may, for example, be configured to perform the operations (600-620) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 600-620 may comprise, for example, the gateway communication manager 180. Additionally or alternatively, at least by virtue of the fact that the processor 170 may be configured to control or even be embodied as the gateway communication manager 180, the processor 170 and/or a device or circuitry for executing instructions or executing an algorithm for processing information as described above may also form example means for performing operations 600-620.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving a request for configuration instructions from a mobile terminal, the configuration instructions defining inter-machine communication parameters including a discontinuous reception configuration for machine type communications;
causing provision of the configuration instructions to one or more machines during an on-duration period in a discontinuous reception cycle, the configuration instructions defining at least a discontinuous reception period and beaconing instructions for the one or more machines relative to machine communications utilizing network defined resources, wherein the one or more machines comprise one or more sensors or communication devices with transmission power limitations, and wherein the one or more machines are configured to perform self-synchronization using synchronization channels and connection requests transmitted by an access point and to make receive signal time difference measurements based on positioning reference signals transmitted by a serving access point and neighboring access points based on measurements that a machine is able to report to a serving device via a mobile gateway and a corresponding access point when a mobile gateway connection becomes available; and
causing provision of connection information to a mobile terminal to identify connection parameters that correspond to the configuration instructions provided to the one or more machines, the connection information enabling establishment of communication between the mobile terminal and the one or more machines, wherein the connection information comprises machine identifiers and machine beacon signal power values; and the connection parameters are provided through Radio Resource Control (RRC) signaling to enable automatic location based cell-specific paging by the mobile terminal.

2. The method of claim 1, wherein causing provision of the configuration instructions comprises causing provision of the configuration instructions responsive to a determination that the mobile terminal is approaching the one or more machines.

3. The method of claim 1, wherein causing provision of connection information to the mobile terminal comprises causing provision of information that facilitates performance of a handshake procedure between the mobile terminal and the one or more machines to enable utilization of the network defined resources allocated for the communication between the mobile terminal and the one or more machines.

4. The method of claim 1, wherein causing provision of the configuration instructions comprises causing provision of discontinuous reception cycle information for beacon signaling.

5. The method of claim 1, wherein causing provision of connection information to the mobile terminal comprises causing provision of instructions for communication to the one or more machines to temporarily increase transmission power to increase a likelihood that otherwise unhearable machines are detectable by the mobile terminal.

6. An apparatus comprising at least one processor and at least one memory including computer program code, the at least one memory and the computer program code configured to, with the processor, cause the apparatus to at least:
receive a request for configuration instructions from a mobile terminal, the configuration instructions defining inter-machine communication parameters including a discontinuous reception configuration for machine type communications;
cause provision of the configuration instructions to one or more machines during an on-duration period in a discontinuous reception cycle, the configuration instructions defining at least a discontinuous reception period and beaconing instructions for the one or more machines relative to machine communications utilizing network defined resources, wherein the one or more machines comprise one or more sensors or communication devices with transmission power limitations, and wherein the one or more machines are configured to perform self-synchronization using synchronization channels and connection requests transmitted by an access point and to make receive signal time difference measurements based on positioning reference signals transmitted by a serving access point and neighboring access points based on measurements that a machine is able to report to a serving device via a mobile gateway and a corresponding access point when a mobile gateway connection becomes available; and cause provision of connection information to a mobile terminal to identify connection parameters that correspond to the configuration instructions provided to the one or more machines, the connection information enabling establishment of communication between the mobile terminal and the one or more machines, wherein the connection information comprises machine identifiers and machine beacon signal power values; and the connection parameters are provided through Radio Resource Control (RRC) signaling to enable automatic location based cell-specific paging by the mobile terminal.

7. The apparatus of claim 6, wherein the memory and computer program code are configured to, with the processor, cause the apparatus to cause provision of the configuration instructions by causing provision of the configuration instructions responsive to a determination that the mobile terminal is approaching the one or more machines.

8. The apparatus of claim 6, wherein the memory and computer program code are configured to, with the processor, cause the apparatus to cause provision of connection information to the mobile terminal by causing provision of information that facilitates performance of a handshake procedure between the mobile terminal and the one or more machines to enable utilization of the network defined resources allocated for the communication between the mobile terminal and the one or more machines.

9. The apparatus of claim 6, wherein the memory and computer program code are configured to, with the processor, cause the apparatus to cause provision of the configuration instructions by causing provision of discontinuous reception cycle information for beacon signaling.

10. The apparatus of claim 6, wherein the memory and computer program code are further configured to, with the processor, cause the apparatus to cause provision of connection information to the mobile terminal by causing provision of instructions for communication to the one or more machines to temporarily increase transmission power to increase a likelihood that otherwise unhearable machines are detectable by the mobile terminal.

11. The apparatus of claim 6, wherein the apparatus is a base station.

12. A method comprising:
receiving configuration instructions from a network device, the configuration instructions defining inter-machine communication parameters including a discontinuous reception configuration for machine type communications;
receiving connection information and configuration instructions for one or more machines from the network device during an on-duration period in a discontinuous reception cycle, the connection information identifying connection parameters that correspond to configuration instructions provided by the network device to one or more machines, wherein the configuration instructions define at least the discontinuous reception cycle and beaconing instructions for the one or more machines relative to machine communications utilizing network defined resources, wherein the one or more machines comprise one or more sensors or communication devices with transmission power limitations, and wherein the one or more machines are configured to perform self-synchronization using synchronization channels and connection requests transmitted by an access point and to make receive signal time difference measurements based on positioning reference signals transmitted by a serving access point and neighboring access points based on measurements that a machine is able to report to a serving device via a mobile gateway and a corresponding access point when a mobile gateway connection becomes available; and utilizing the connection information to establish communication between a mobile terminal and the one or more machines using the connection parameters defining at least a discontinuous reception period and beaconing instructions for utilizing network defined resources, wherein the connection information comprises machine identifiers and machine beacon signal power values; and the connection parameters are received through Radio Resource Control (RRC) signaling to enable automatic location based cell-specific paging by the mobile terminal.

13. The method of claim 12, further comprising causing provision of a request for configuration instructions to the network device, and wherein receiving the configuration instructions comprises receiving the configuration instructions responsive to the request.

14. The method of claim 12, wherein receiving the connection information comprises receiving instructions for communication to the one or more machines to temporarily increase transmission power to increase a likelihood that otherwise unhearable machines are detectable.

15. An apparatus comprising at least one processor and at least one memory including computer program code, the at least one memory and the computer program code configured to, with the processor, cause the apparatus to at least:
receive configuration instructions from a network device, the configuration instructions defining inter-machine communication parameters including a discontinuous reception configuration for machine type communications;
receive connection information and configuration instructions for one or more machines from the network device during an on-duration period in a discontinuous reception cycle, the connection information identifying connection parameters that correspond to configuration instructions provided by the network device to one or more machines, wherein the configuration instructions define at least the discontinuous reception cycle and beaconing instructions for the one or more machines relative to machine communications utilizing network defined resources, wherein the one or more machines comprise one or more sensors or communication devices with transmission power limitation, and wherein the one or more machines are configured to perform self-synchronization using synchronization channels and connection requests transmitted by an access point and to make receive signal time difference measurements based on positioning reference signals transmitted by a serving access point and neighboring access points based on measurements that a machine is able to report to a serving device via a mobile gateway and a corresponding access point when a mobile gateway connection becomes available s; and
utilize the connection information to establish communication between the apparatus and the one or more machines using the connection parameters defining at least a discontinuous reception period and beaconing instructions for utilizing network defined resources, wherein the connection information comprises machine identifiers and machine beacon signal power values; and the connection parameters are received through Radio Resource Control (RRC) signaling to enable automatic location based cell-specific paging by the apparatus.

16. The apparatus of claim 15, wherein the memory and computer program code are further configured to, with the processor, cause the apparatus to cause provision of a request for configuration instructions to the network device, and wherein receiving the configuration instructions comprises receiving the configuration instructions responsive to the request.

17. The apparatus of claim 15, wherein the memory and computer program code are configured to, with the processor, cause the apparatus to receive the connection information by receiving instructions for communication to the one or more machines to temporarily increase transmission power to increase a likelihood that otherwise unhearable machines are detectable.

18. The apparatus of claim 15, wherein the apparatus is a mobile terminal.

19. A method comprising:
performing self-synchronization using synchronization channels and connection requests transmitted by an access point;
making receive signal time difference measurements based on positioning reference signals transmitted by a serving access point and neighboring access points based on measurements that a machine is able to report to a serving device via a mobile gateway and a corresponding access point when a mobile gateway connection becomes available;
receiving configuration instructions from a network entity, the configuration instructions defining inter-machine communication parameters including discontinuous reception configuration for machine type communications;
causing transmission of beacon signals based on the received configuration instructions during an on-duration period in a discontinuous reception cycle for discovering other nearby machines using the inter-machine communication parameters, wherein the configuration instructions define at least the discontinuous reception cycle and beaconing instructions for one or more machines relative to machine communications utilizing network defined resources, and the one or more machines comprise one or more sensors or communication devices with transmission power limitations;
storing a list of machine beacon signal received power values and an indication as to whether a connection request has been sent to the network entity; and
enabling formation of machine groups based on exchanging configuration information with the other nearby machines, wherein the configuration information comprises machine identifiers, machine beacon signal power values, and connection parameters provided through Radio Resource Control (RRC) signaling for facilitating automatic location based cell-specific paging by a mobile terminal.

20. The method of claim 19, wherein the inter-machine communication parameters include information defining a discontinuous reception cycle for inter-machine communication.

21. An apparatus comprising at least one processor and at least one memory including computer program code, the at least one memory and the computer program code configured to, with the processor, cause the apparatus to at least:
perform self-synchronization using synchronization channels and connection requests transmitted by an access point;
make receive signal time difference measurements based on positioning reference signals transmitted by a serving access point and neighboring access points based on measurements that a machine is able to report to a serving device via a mobile gateway and a corresponding access point when a mobile gateway connection becomes available;
receive configuration instructions from a network entity, the configuration instructions defining inter-machine communication parameters including a discontinuous reception configuration for machine type communications;
cause transmission of beacon signals based on the received configuration instructions during an on-duration period in a discontinuous reception cycle for discovering other nearby machines using the inter-machine communication parameters, wherein the configuration instructions define at least the discontinuous reception cycle and beaconing instructions for one or more machines relative to machine communications utilizing network defined resources, and the one or more machines comprise one or more sensors or communication devices with transmission power limitations;
store a list of machine beacon signal received power values and an indication as to whether a connection request has been sent to the network entity; and
enable formation of machine groups based on exchanging information with the other nearby machines, wherein the configuration information comprises machine identifiers, machine beacon signal power values, and connection parameters provided through Radio Resource Control (RRC) signaling for facilitating automatic location based cell-specific paging by a mobile terminal.

22. The apparatus of claim 21, wherein the inter-machine communication parameters include information defining a discontinuous reception cycle for inter-machine communication.

* * * * *